US012424664B2

(12) United States Patent
El-Zahab et al.

(10) Patent No.: US 12,424,664 B2
(45) Date of Patent: Sep. 23, 2025

(54) ELECTROLYTES COMPRISING THIOAMIDES FOR USE IN ELECTROCHEMICAL BATTERIES

(71) Applicant: The Florida International University Board of Trustees, Miami, FL (US)

(72) Inventors: Bilal M. El-Zahab, Miami, FL (US); Archana Loganathan, Miami, FL (US); Govinda Ghimire, Miami, FL (US); Osama Awadallah, Miami, FL (US); Dambar Hamal, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 511 days.

(21) Appl. No.: 17/937,861

(22) Filed: Oct. 4, 2022

(65) Prior Publication Data

US 2024/0113339 A1    Apr. 4, 2024

(51) Int. Cl.
| | |
|---|---|
| *H01M 10/0569* | (2010.01) |
| *H01M 4/38* | (2006.01) |
| *H01M 10/0525* | (2010.01) |
| *H01M 10/0567* | (2010.01) |
| *H01M 10/0568* | (2010.01) |
| *H01M 10/058* | (2010.01) |
| *H01M 50/417* | (2021.01) |
| *H01M 50/46* | (2021.01) |
| *H01M 4/02* | (2006.01) |

(52) U.S. Cl.
CPC ....... *H01M 10/0569* (2013.01); *H01M 4/382* (2013.01); *H01M 10/0525* (2013.01); *H01M 10/0567* (2013.01); *H01M 10/0568* (2013.01); *H01M 50/417* (2021.01); *H01M 50/46* (2021.01); *H01M 2004/027* (2013.01); *H01M 2300/0028* (2013.01); *H01M 2300/0051* (2013.01)

(58) Field of Classification Search
CPC ......... H01M 10/0567; H01M 10/0568; H01M 10/0569; H01M 2300/0051; H01M 4/382
See application file for complete search history.

(56) References Cited

U.S. PATENT DOCUMENTS

2021/0305548 A1    9/2021    El-Zahab et al.

FOREIGN PATENT DOCUMENTS

| | | |
|---|---|---|
| WO | 2020/015234 | 1/2020 |
| WO | 2022/186490 | 9/2022 |

OTHER PUBLICATIONS

WO2020015234 English translation. WAng et al. Wipo. Jan. 23, 2020. (Year: 2020).*
International Search Report/Written Opinion, International Application No. PCT/US2022/077503; mail date Dec. 13, 2022, 18 pages.

(Continued)

*Primary Examiner* — Christopher P Domone
(74) *Attorney, Agent, or Firm* — SALIWANCHIK, LLOYD & EISENSCHENK

(57) ABSTRACT

Electrolytes for improved electrochemical batteries are provided. A carbonate-based electrolyte can include a thioamide compound (e.g., thioacetamide (TAA), thiourea (THU), or thioformamide). The electrolyte can include a salt, a carbonate solvent, and the thioamide compound as an additive. The thioamide compound can be present in a concentration of, for example, 1 millimolar (mM) to 100 mM.

19 Claims, 7 Drawing Sheets

Thioacetamide

Thiourea

Thioformamide

(56) References Cited

OTHER PUBLICATIONS

Qian Wang et al., Dendrite-Free Lithium Deposition via a Superfiling Mechanism for High-perfomance Li-Metal Batteries, Advanced Materials, 2019, 31, 1903248, 10 pages.

Jie Li et al., Dual-enhancement on electrochemical performance with thioacetamide as an electrolyte additive for lithium-sulfur batteries, Electrochimica Acta 376 (2021) 138041, 10 pages.

* cited by examiner

Thioacetamide       Thiourea       Thioformamide

ELECTROLYTES COMPRISING THIOAMIDES FOR USE IN ELECTROCHEMICAL BATTERIES

BACKGROUND

Good stability and high cycle performance of lithium metal anodes are critical to the development and commercialization of high energy-density lithium metal batteries (LMBs). Electrolyte additives, typically in the amount of 5% either by weight or volume of electrolyte, can interact with the negative/positive electrode surface through diffusion (such as physical adsorption or chemical absorption) or non-diffusion mechanisms (such as ion pairs, complex formation, and surface tension) to form a passivation layer that enhances the electrode stability during cycling (see also, e.g.; Eshetu et al., Electrolyte Additives for Lithium Metal Anodes and Rechargeable Lithium Metal Batteries: Progress and Perspectives, Angew. Chem.—Int. Ed., vol. 57, no. 46, pp. 15002-15027, 2018, doi: 10.1002/anie.201712702; and Zhang, A review on electrolyte additives for lithium-ion batteries, J. Power Sources, vol. 162, no. 2, pp. 1379-1394, 2006, doi: 10.1016/j.jpowsour.2006.07.074). Various organic and inorganic compounds have been investigated as electrolyte additives for LMBs, and the most common families include fluorine-containing compounds (e.g., fluoroethylene carbonate (FEC)), unsaturated carbonates (e.g., vinylene carbonate (VC)), silicon-containing compounds (e.g., tris(trimethylsilyl) phosphate (TTSP)), and nitrogen-containing compounds (e.g., lithium nitrate ($LiNO_3$)).

BRIEF SUMMARY

Embodiments of the subject invention provide novel and advantageous compounds, devices, and methods for improved battery systems (e.g., lithium (Li)-ion battery systems). A carbonate-based electrolyte can include a thioamide compound (e.g., thioacetamide (TAA), thiourea (THU), or thioformamide) and can provide improved results when used in a battery system (e.g., an Li-ion battery system), including cycle stability, interfacial resistance, and overpotential stabilization. The electrolyte can include a salt (e.g., a lithium salt such as lithium hexafluorophosphate ($LiPF_6$) or lithium tetrafluoroborate ($LiBF_4$)), a carbonate solvent (e.g., ethylene carbonate (EC), ethyl methyl carbonate (EMC), or dimethyl carbonate (DMC)), and the thioamide compound as an additive. The thioamide compound can be present in a concentration of, for example, 1 millimolar (mM) to 100 mM.

In an embodiment, an electrolyte for an electrochemical battery can comprise: a carbonate solvent; a salt dissolved in the carbonate solvent; and a thioamide compound dissolved in the carbonate solvent. The thioamide compound can be, for example, TAA, THU, or thioformamide. The thioamide compound can be present in the carbonate solvent at a concentration in a range of from 1 mM to 100 mM (e.g., 1 mM to 50 mM, or 1 mM to 10 mM). The salt can be, for example, $LiPF_6$ or $LiBF_4$. The salt can be present in the carbonate solvent at a concentration in a range of from 0.5 molar (M) to 5 M (e.g., 1 M or about 1 M). The carbonate solvent can be, for example, EC, EMC, or DMC.

In a further embodiment, an electrochemical battery can comprise: an anode; a cathode; a separator disposed between the anode and the cathode; and an electrolyte as disclosed herein disposed within (e.g., soaked into and/or injected into a dry version of) the separator. The anode can be, for example, a lithium metal anode; the cathode can be, for example, a metal oxide cathode; and the electrochemical battery can be, for example, an Li-ion battery. The electrochemical battery can have stability over at least 220 cycles (e.g., at least 230 cycles, at least 240 cycles, at least 250 cycles, or at least 260 cycles) at 90% capacity retention.

In another embodiment, a method of fabricating an electrolyte for an electrochemical battery can comprise: providing a carbonate solvent; dissolving a salt in the carbonate solvent; and dissolving a thioamide compound in the carbonate solvent to give the electrolyte. The thioamide compound can be, for example, TAA, THU, or thioformamide. The thioamide compound can be dissolved in the carbonate solvent at a concentration in a range of from 1 mM to 100 mM (e.g., 1 mM to 50 mM, or 1 mM to 10 mM). The salt can be, for example, $LiPF_6$ or $LiBF_4$. The salt can be dissolved in the carbonate solvent at a concentration in a range of from 0.5 M to 5 M (e.g., 1 M or about 1 M). The carbonate solvent can be, for example, EC, EMC, or DMC.

DETAILED DESCRIPTION

Figure 1:
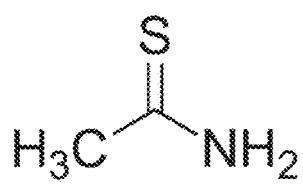
FIG. 1 shows chemical structures of three thioamide compounds—thioacetamide (TAA), thiourea (THU), and thioformamide.
Figure 1:
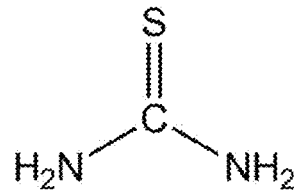
Figure 1:

Embodiments of the subject invention provide novel and advantageous compounds, devices, and methods for improved battery systems (e.g., lithium (Li)-ion battery systems). A carbonate-based electrolyte can include a thioamide compound (e.g., thioacetamide (TAA), thiourea (THU), or thioformamide) and can provide improved results when used in a battery system (e.g., an Li-ion battery system), including cycle stability, interfacial resistance, and overpotential stabilization. The electrolyte can include a salt (e.g., a lithium salt such as lithium hexafluorophosphate (LiPF$_6$) or lithium tetrafluoroborate (LiBF$_4$)), a carbonate solvent (e.g., ethylene carbonate (EC), ethyl methyl carbonate (EMC), or dimethyl carbonate (DMC)), and the thioamide compound as an additive. The thioamide compound can be present in a concentration of, for example, 1 millimolar (mM) to 100 mM.

The use of electrolyte additives is a simple and cost-effective strategy to improve the cyclability of lithium metal batteries (LMBs). Organosulfur compounds can provide high compatibility (i.e., high reduction potentials and electronegativity comparable to carbon) with common lithium-ion battery (LIB) electrode and electrolyte systems (see also, e.g., Zhao et al., Recent advances in the research of functional electrolyte additives for lithium-ion batteries, Curr. Opin. Electrochem., vol. 6, no. 1, pp. 84-91, 2017, doi: 10.1016/j.coelec.2017.10.012; which is hereby incorporated herein by reference in its entirety). Additionally, the abundance of sulfur allows high scale production of organosulfur compounds at a low cost. Organosulfur compounds applied in electrochemistry include cyclic sulfonates (e.g., 1,3-propane sulfone (PS)), chain sulfonates (e.g., propargyl methanesulfonate (PMS)), sulfates (e.g., 1,3,2-dioxathiolane-2,2-dioxide (DTD)), sulfites (e.g., ethylene sulfite (ES)), and sulfones (e.g., sulfolane (SL)). Other organosulfur compounds include lithium salts (e.g., lithium bis (trifluoromethanesulfonyl) imide (LiTFSI) and lithium-cyclodifluoromethane-1,1-bis (sulfonyl) imide (LiDMSI)).

Organosulfur additives such as PS and 1,4-butane sulfone (BS) were introduced as electrolyte additives to stabilize polymeric electrodes during cycling (see also, e.g., Maxfield et al., Polymeric electrode coated with a reaction product or organosulfur compound, Sep. 18, 1984; which is hereby incorporated herein by reference in its entirety). ES was introduced as an electrolyte additive to LIBs due to its similarity to ethylene carbonate (EC) structure (see also, e.g., Naruse et al., "Secondary nonaqueous electrolyte batteries using improved electrolyte solvents, May 6, 1997; which is hereby incorporated herein by reference in its entirety). The sulfate-based additive, dioxathiolane-2,2-dioxide (DTD) has also been used (see also, e.g., Shima et al., Electrolyte solutions containing cyclic sulfate esters for secondary lithium batteries, Jul. 21, 1998; which is hereby incorporated herein by reference in its entirety). Many of the organosulfur compounds including ES, PS, and DTD can be beneficial to the positive electrodes by forming a stable sulfate-rich cathode electrolyte interface (CEI) layer in Ni-rich NMC cathodes and graphite anode cells (see also, e.g., An et al., S-containing and Si-containing compounds as highly effective electrolyte additives for SiOx-based anodes/NCM 811 cathodes in lithium ion cells, Sci. Rep., vol. 9, no. 1, p. 14108, October 2019, doi: 10.1038/s41598-019-49568-1; which is hereby incorporated herein by reference in its entirety). Nevertheless, the above-mentioned classes of organosulfur compounds decompose through a multi-step and complex process, which generates harmful byproducts that degrade the battery performance. Other issues include excessive gas generation (e.g., DTD in 1.0 M LiPF$_6$ EC/DMC) and high interfacial resistance over prolonged cycling (e.g., ES in 1.0 M LiClO$_4$ PC) (see also, e.g.; Li et al., Ethylene sulfate as film formation additive to improve the compatibility of graphite electrode for lithium-ion battery, Ionics, vol. 20, no. 6, pp. 795-801, 2014, doi: 10.1007/s11581-013-1036-5; and Ota et al., TPD-GC/MS analysis of the solid electrolyte interface (SEI) on a graphite anode in the propylene carbonate/ethylene sulfite electrolyte system for lithium batteries, J. Power Sources, vol. 97-98, pp. 107-113, 2001, doi: 10.1016/s0378-7753(01)00738-8; both of which are hereby incorporated herein by reference in their entireties).

FIG. 1 shows chemical structures of three thioamide compounds—TAA, THU, and thioformamide. Referring to FIG. 1, the chemical structure of thioamides includes a carbon-sulfur double bond (C=S) and can be described with the general formula of "R$_1$—CS—NR$_2$R$_3$", where R$_1$, R$_2$, and R$_3$ represent organic groups (see also, e.g.; Kamimachi et al., Oxidation reduction active polymers with good degradation resistance during charge-discharge cycles for electrodes and nonaqueous electric batteries, Jul. 21, 2005; Kim et al., Cathode active material for lithium secondary battery having improved operational stability, and electrical property, May 7, 2020; Kojima et al., Secondary lithium-ion batteries with cation-conducting (thio)amide-containing polymer electrolytes, Apr. 4, 2013; He et al., Dual-enhancement on electrochemical performance with thioacetamide as an electrolyte additive for lithium-sulfur batteries, Electrochimica Acta, vol. 376, p. 138041, 2021, doi: https://doi.org/10.1016/j.electacta.2021.138041; and Wang et al., Dendrite-Free Lithium Deposition via a Superfilling Mechanism for High-Performance Li-Metal Batteries, Adv. Mater., vol. 31, no. 41, pp. 1-10, 2019, doi: 10.1002/adma.201903248; all of which are hereby incorporated by reference herein in their entireties.

In an embodiment, a formulated carbonate-based electrolyte system can include at least one (e.g., exactly one) thioamide compound (e.g., TTA, THU, or thioformamide). The formulated carbonate-based electrolyte can be used in a battery system (e.g., a lithium-ion battery (LIB) system), such as a system that uses intercalation layered metal oxide cathodes (e.g., LiNi$_{0.8}$Mn$_{0.1}$Co$_{0.1}$O$_2$ (NMC811) or LiNi$_{0.6}$Mn$_{0.2}$Co$_{0.2}$O$_2$ (NMC662)) and a metal anode (e.g., a lithium metal anode).

The electrolyte can comprise a salt (e.g., a lithium salt such as lithium hexafluorophosphate (LiPF$_6$) or lithium tetrafluoroborate (LiBF$_4$)), a carbonate solvent (e.g., ethylene carbonate (EC), ethyl methyl carbonate (EMC), or dimethyl carbonate (DMC)), and a thioamide compound as an additive (e.g., TAA, THU, or thioformamide). The thioamide compound can be present in a concentration of any of the following values, about any of the following values, at least any of the following values, at most any of the following values, or within any range having any of the following values as endpoints (all values are in mM): 0.05, 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 125, 150, 175, 200, 250, or 300. For example, the thioamide compound can be present in a concentration in a range of from 1 mM to 100 mM (e.g., 1 mM to 50 mM, or 1 mM to 10 mM). The purity of the thioamide compound can be any of the following values, about any of the following values, at least any of the following values, at most any of the following values, or within any range having any of the following values as endpoints (all values are in percent (%)): 80, 85, 90, 91, 92, 93, 94, 95, 96, 97, 98, 99, 99.1, 99.2, 99.3, 99.4, 99.5, 99.6, 99.7, 99.8, 99.9, or 100. For example, the purity of the thioamide compound can be at least 99%.

The electrolytes having the thioamide compound provide improved cycle stability compared to electrolytes that do not have a thioamide compound. For example, an electrolyte with TAA can provide stability over 260 cycles at 90% capacity retention, and an electrolyte with THU can provide stability over 230 cycles at 90% capacity retention, while an electrolyte with no thioamide compound provides stability for 150 cycles at 90% capacity retention. The electrolytes that do not have a thioamide compound (which can be referred to as "blank" electrolytes) were entirely the same as the electrolytes having the thioamide compound except for the lack of presence of the thioamide compound. Using a thioamide electrolyte with amine and carbonyl functional groups (—NH2, —C=O) present in the electrolyte stabilizes the SEI layer on the anode surface by preventing or inhibiting the severe decomposition of the anion of the Li salt. The role of the carbonyl group is to coordinate with Li+ ions, whereas the amine group coordinates with the anion of the salt, resulting in better cycling stability of the Li anode in batteries. Because the S—Li coordinate bond is softer than the O—Li bond, the thioamide additive can extend the battery cycle life through its cooperative effect compared with the amide or carbonyl additive only. Therefore, the cycling stability of the Li anode in the presence of thioamide in the electrolyte system can be attributed to a faster and smoother Li+ ion coordination during battery operation The electrolytes having the thioamide compound can be readily used and remain stable when stored for several weeks. A molecular sieve can be used to remove moisture when storing the electrolyte for a prolonged time (e.g., more than a week).

Electrolytes of embodiments of the subject invention, including a thioamide additive, advantageously stabilize the anode (e.g., Li metal anode) in batteries (e.g., Li-ion batteries) and provide longer cycle life with less dendrite growth and less ohmic resistance growth. The inclusion of a thioamide additive in a carbonate-based electrolyte (e.g., in an concentration of 1 mM-100 mM) provides in initial formation cycles the formation of a stabilizing/passivating layer on the surface of the anode (e.g., Li anode), rendering the anode passive to the carbonate electrolyte and stabilizing the anode. This stabilization leads to loner cycle life for the battery as it conserves the ionic conductive pathways while maintaining a stable solid electrolyte interface.

In an embodiment, a battery (e.g., a Li-ion battery or LMB) can include an anode, a cathode, a separator, and an electrolyte as disclosed herein. The separator can be, for example, a polypropylene separator, though embodiments are not limited thereto. The anode can be, for example, a Li metal anode, though embodiments are not limited thereto. The cathode can be, for example, a metal oxide cathode, though embodiments are not limited thereto. The electrolyte can be applied to the separator (e.g., the separator can be soaked in the electrolyte for a period of time (e.g., several hours) or the electrolyte can be directly injected on a dry separator during battery assembly).

Embodiments of the subject invention also provide methods of fabricating an electrolyte having a thioamide compound. A thioamide compound (e.g., in a concentration as disclosed herein, such as 1 mM to 100 mM) can be added to a carbonate solvent (e.g., EC, EMC, or DMC). A salt (e.g., a lithium salt such as $LiPF_6$ or $LiBF_4$) can be added to the carbonate solvent, either before or after the thioamide compound is added. For example, the salt can be added (e.g., in a concentration of, for example, 0.5 M to 5 M, such as 1 M) to and dissolved in the solvent, and then the thioamide compound can be added to and dissolved in the solvent to give the electrolyte. A method of forming a battery can include providing an anode and a cathode, and then providing an electrolyte as disclosed herein to the battery (for example by applying the electrolyte to a separator of the battery). The separator can be soaked in the electrolyte for a period of time (e.g., several hours), or the electrolyte can be directly injected on a dry separator during battery assembly.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1—NMC811 Li Full Cell Performance with TAA

Full CR2032 coin cells including a NMC811 cathode (8-12 milligrams per square centimeter ($mg/cm^2$) loading), a lithium metal anode, and a polypropylene separator (Celgard) were assembled first with a blank electrolyte (no thioamide compound) and then separately with an electrolyte including TAA as described herein. The concentration of the TAA was 1 mM to 10 mM TAA in 1 molar (M) $LiPF_6$ EC/DMC). The polypropylene separator was either soaked in the formulated electrolyte overnight, or the electrolyte was directly injected on a dry separator during cell assembly. The formulated electrolyte was dropped on the NMC cathode surface or the lithium foil surface and allowed to react/rest before final assembly. A crimping pressure of 70 pounds per square inch (psi) to 90 psi was used to assemble the coin cells.

Figure 2:
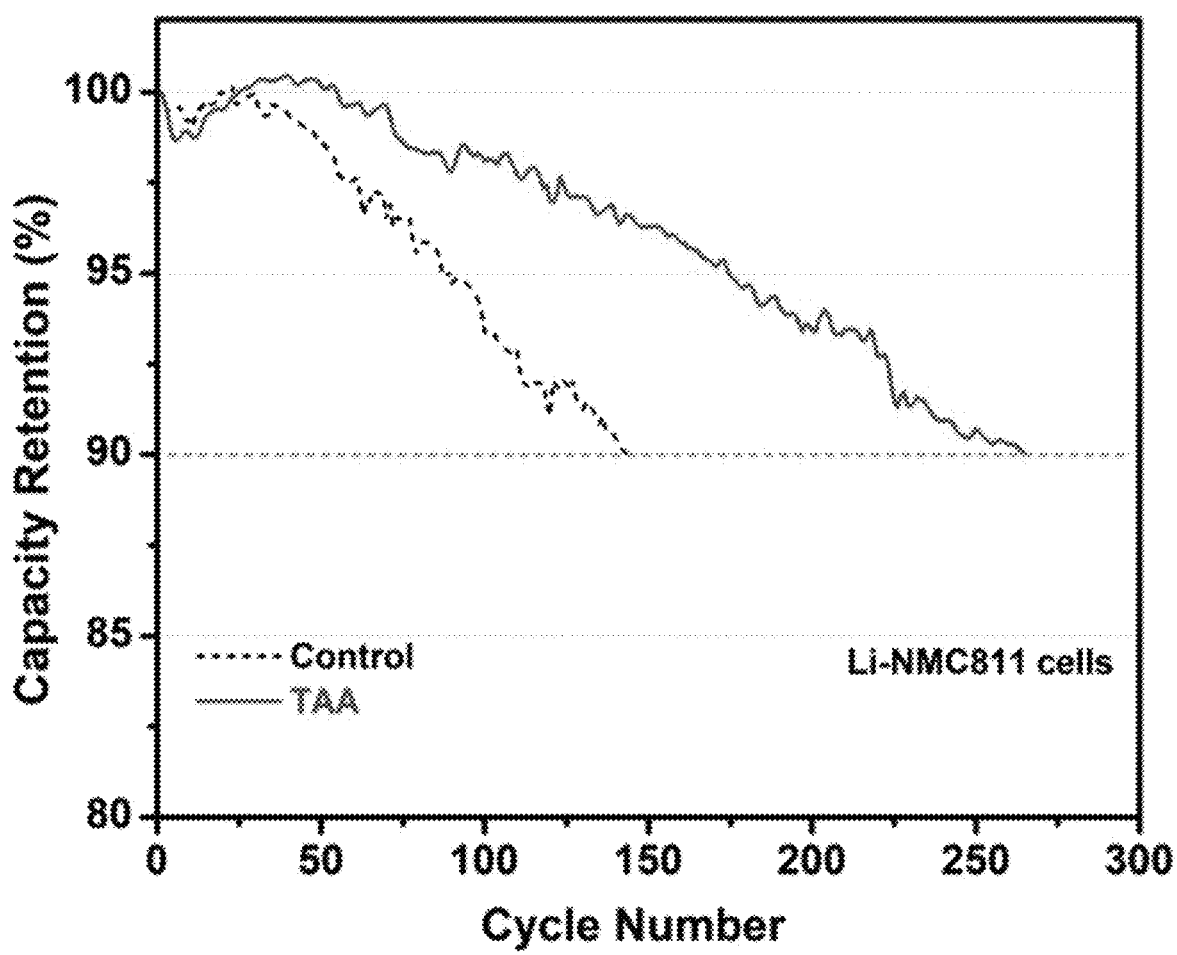
FIG. 2 shows a plot of capacity retention (in percentage (%)) versus cycle number, showing cycle performance of NMC811 lithium (Li) full cells with an electrolyte including TAA (solid line) and with a control electrolyte (dashed line).
Figure 3:
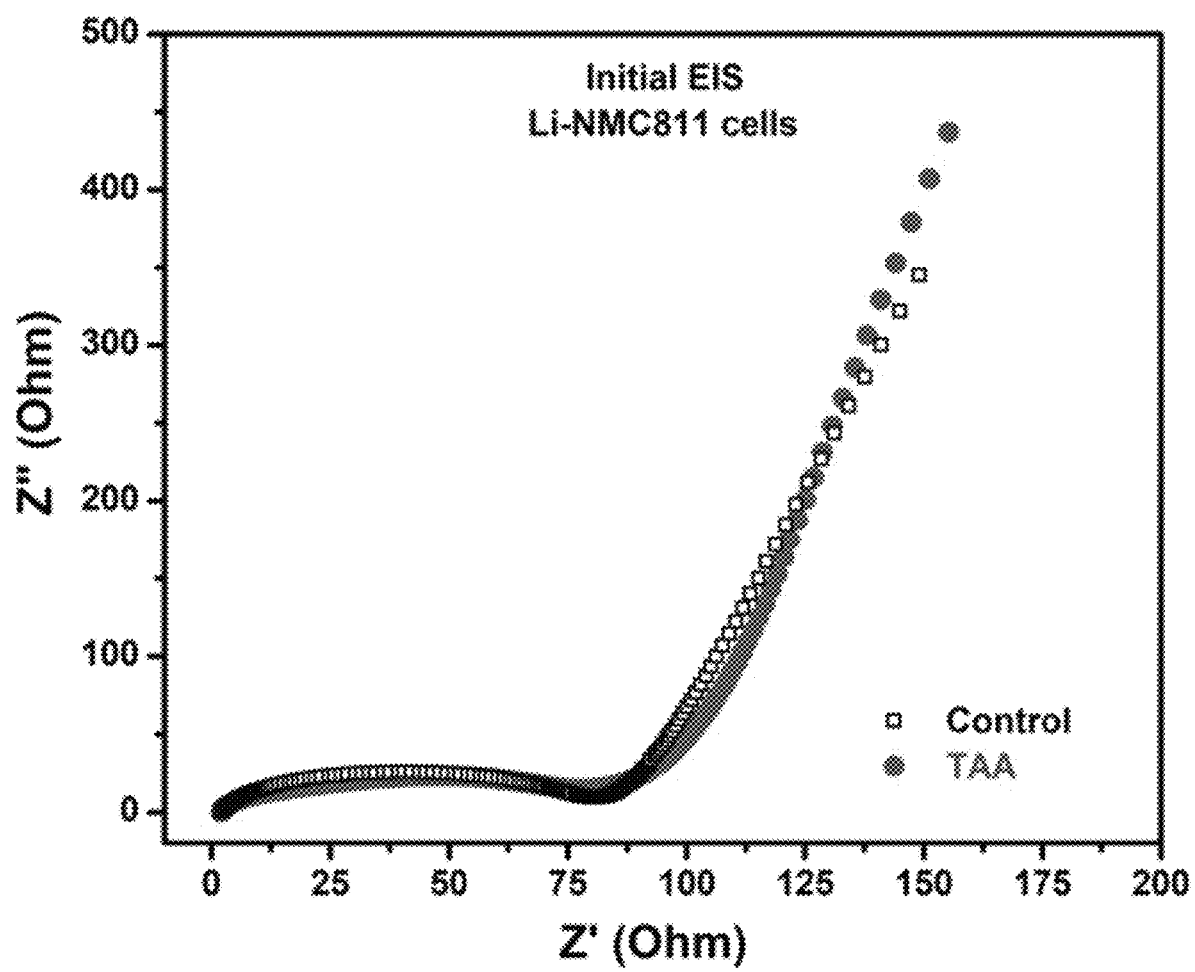
FIG. 3 shows a plot of Z" (in Ohms ($\Omega$)) versus Z' (in $\Omega$), showing the initial electrochemical impedance spectroscopy (EIS) Nyquist plot of NMC811 Li full cells with an electrolyte including TAA (circle data points) and with a control electrolyte (square data points).
Figure 4:
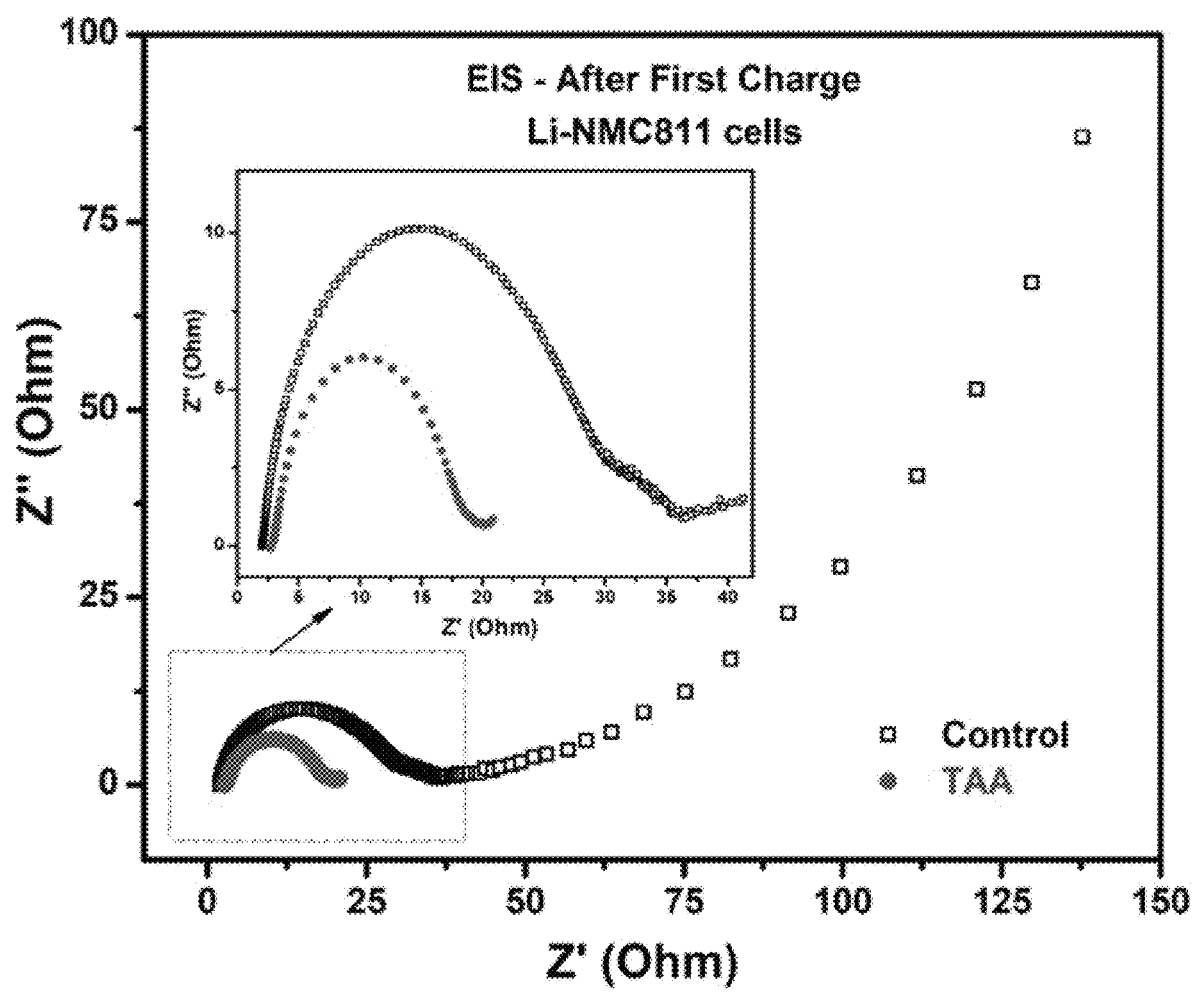
FIG. 4 shows a plot of Z" (in $\Omega$) versus Z' (in $\Omega$), showing the EIS Nyquist plot of NMC811 Li full cells with an electrolyte including TAA (circle data points with the lower Z" values) and with a control electrolyte (square data points with the higher Z" values), after activation cycles and one C/3 charge cycle.
Figure 5:
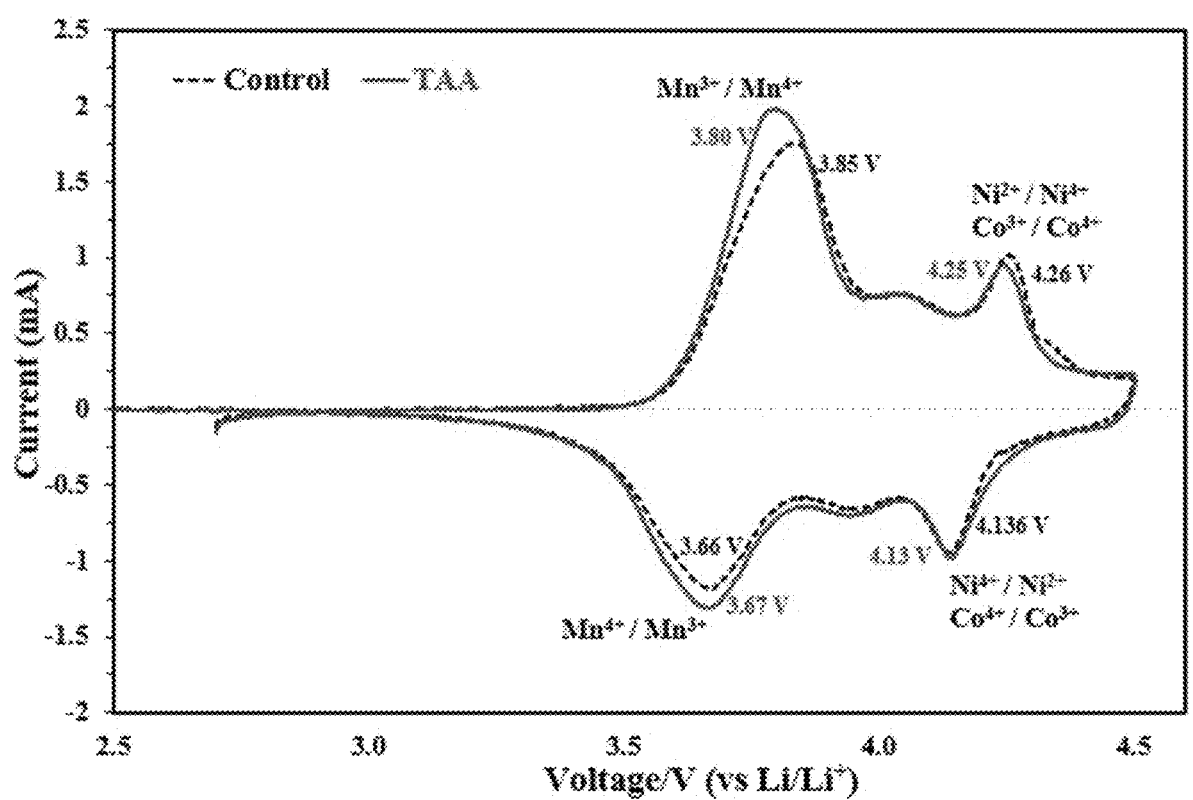
FIG. 5 shows a plot of current (in milliamps (mA)) versus voltage (in Volts (V)) (versus Li/$Li^+$), showing the cyclic voltammetry (CV) plots of NMC811 Li full cells with an electrolyte including TAA (solid line) and with a control electrolyte (dashed line).

The cells were subjected to an initial resting and subsequently activated at a slow rate prior to continuous cycling at higher rates (e.g., C/3 for charging and 1C for discharge). Referring to FIG. 2, cells that used the TAA formulated electrolyte were stable for 230 cycles with 90% capacity retention compared to the control (or blank; i.e., no thioamide compound) electrolyte that lasted only 150 cycles. Referring to FIG. 2, initial electrochemical impedance spectroscopy (EIS) measurement tests of the fresh full cell showed interfacial resistance of 80 Ohms (Ω) for both the blank and TAA electrolytes. Referring to FIG. 4, EIS measurements following the activation cycles and one high charge rate cycle showed increased resistance in cells with the blank electrolyte compared to cells that used the TAA formulated electrolyte. Referring to FIG. 5, cyclic voltammetry scans for full cells having the blank electrolyte and the TAA electrolyte showed a peak shift that indicates a lower overpotential for the TAA formulated electrolyte cells compared to the control.

Example 2—NMC811 Li Full Cell Performance with THU

Figure 6:
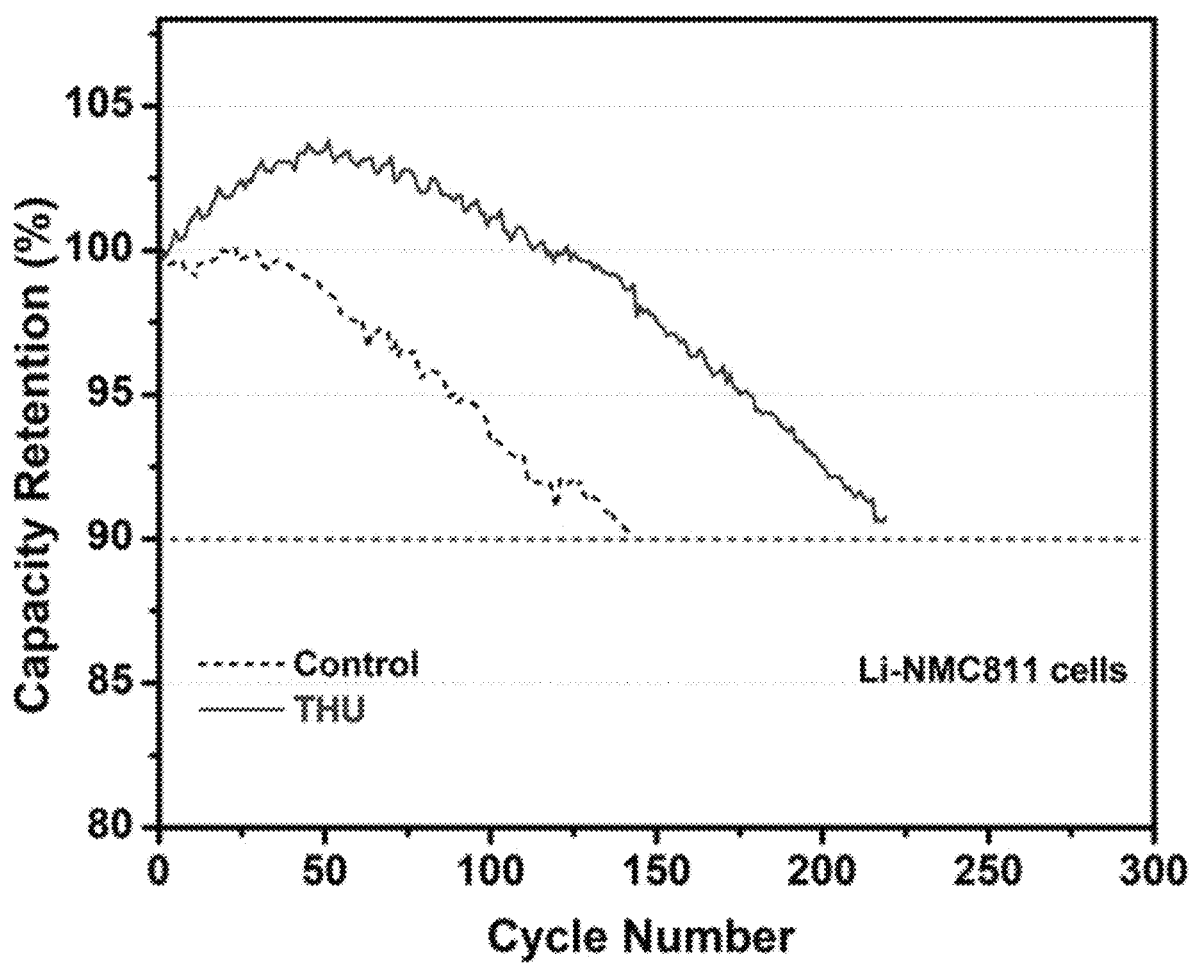
FIG. 6 shows a plot of capacity retention (in %) versus cycle number, showing cycle performance of NMC811 lithium (Li) full cells with an electrolyte including THU (solid line) and with a control electrolyte (dashed line).

Example 1 was repeated, except an electrolyte including THU as described herein was used instead of the electrolyte including TAA. The concentration of the THU was 1 mM to 10 mM TAA in 1 M LiPF$_6$ EC/DMC). Cells were subjected to an initial resting and subsequently activated at a slow rate prior to continuous cycling at higher rates (e.g., C/3 for charging and 1C for discharge). FIG. 6 shows the higher cycle stability of the cell with the THU formulated electrolyte, which had 230 cycles at 90% capacity retention compared to the cell begin of life (BOL). In comparison, the control cells had only 150 cycles at 90% capacity retention.

Example 3—Lithium Metal Symmetric Cells with TAA

Figure 7:
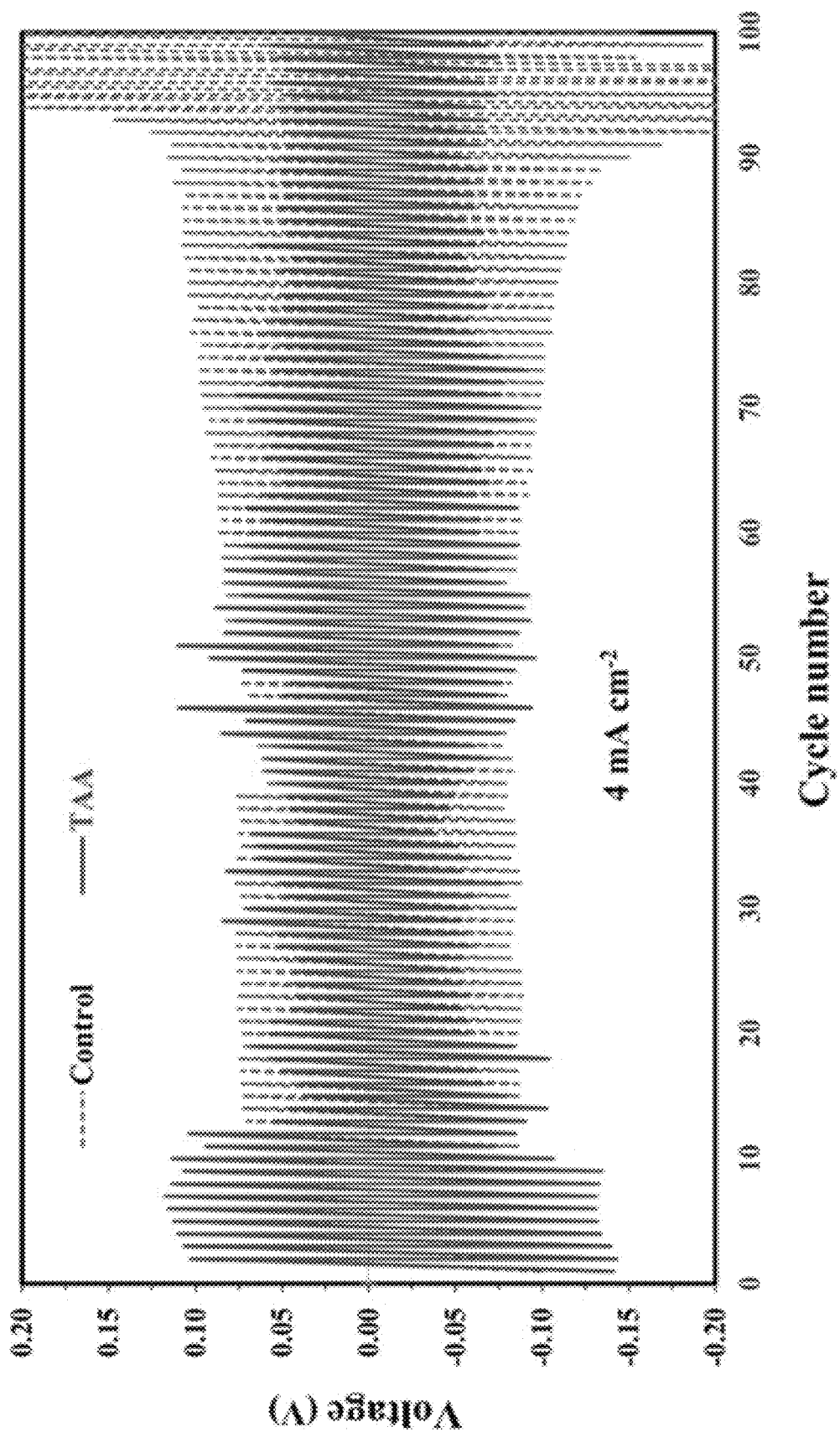
FIG. 7 is a plot of voltage (in V) versus cycle number, showing the symmetric cell charge/discharge data for an electrolyte including TAA (solid line with the lower voltage values at higher cycle numbers) and with a control electrolyte (dashed line with higher voltage values at higher cycles numbers). The current density was 4 milliamps per square centimeter ($mA/cm^2$).

Symmetric cells of Li—Li electrodes were assembled out of two lithium foils separated by a polypropylene separator (Celgard) in a CR2032 coin cell. The separator was soaked in a TAA formulated electrolyte (as applied in Example 1) prior to assembly. Cells were rested and then cycled at different rates (e.g., 1.0 milliamps per square centimeter (mA/cm$^2$), 2.0 mA/cm$^2$, 4.0 mA/cm$^2$). Referring to FIG. 7, the charge/discharge data for the blank electrolyte and the TAA formulated electrolyte show a higher initial overpotential for the TAA formulated electrolyte. Within 10 cycles, the TAA cell stabilized below 50 millivolts (mV) and remained stable for 100 cycles while the control cell voltage shows a continuous increase that rapidly crosses 200 mV as an indication of high interfacial resistance growth in cells with the blank electrolyte. This symmetric cell test indicates a more stabilized lithium anode interface in the TAA formulated cell in comparison to the control cells that used the blank electrolyte.

Example 4—Lithium Metal Anode Symmetric Cells with THU

Figure 8:
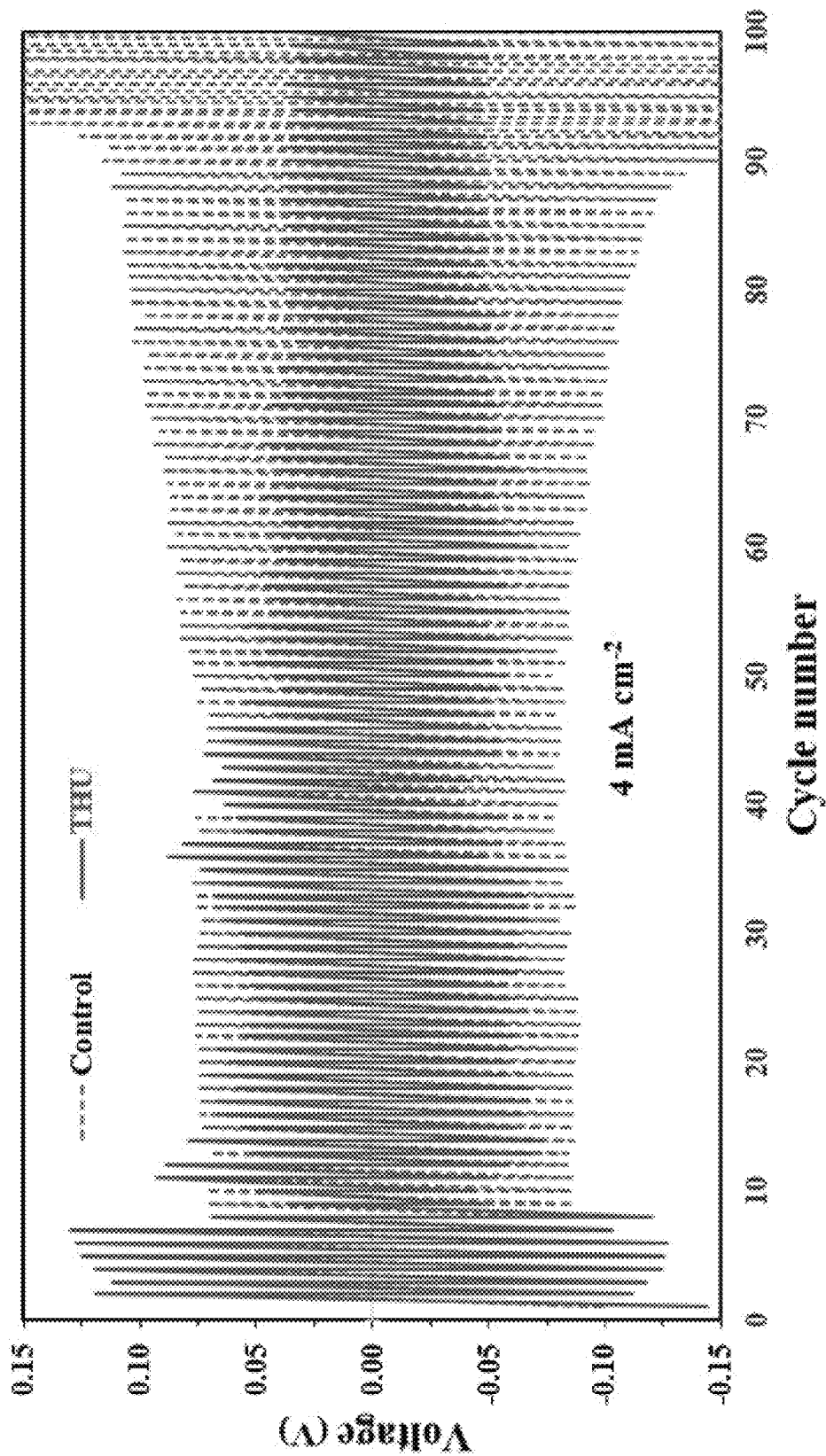
FIG. 8 is a plot of voltage (in V) versus cycle number, showing the symmetric cell charge/discharge data for an electrolyte including THU (solid line with the lower voltage values at higher cycle numbers) and with a control electrolyte (dashed line with higher voltage values at higher cycles numbers). The current density was 4 $mA/cm^2$.

Example 3 was repeated, except the electrolyte from Example 2 (including THU) was used instead of the electrolyte including TAA (from Example 1). The separator was soaked in the THU formulated electrolyte prior to assembly. Cells were rested and then cycled at different rates (e.g., 1.0 mA/cm$^2$, 2.0 mA/cm$^2$, 4.0 mA/cm$^2$). Referring to FIG. 8, the charge/discharge data for the blank electrolyte and THU formulated electrolyte show a higher initial overpotential for the THU formulated electrolyte. The THU cells started with a higher overpotential voltage compared to the control cells and then stabilized within the first 10 cycles. The THU cell stabilized below 30 mV after 50 cycles and remained stable for 100 cycles while the control cell shows a stable voltage at 60 mV up to 40 cycles and then the voltage continuously increases and rapidly crosses 200 mV. This symmetric cell test indicates a more stabilized lithium anode interface in the THU formulated cell in comparison to the control cells that used the blank electrolyte.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An electrolyte for an electrochemical battery, the electrolyte comprising:
   a carbonate solvent;
   a salt dissolved in the carbonate solvent; and
   a thioamide compound dissolved in the carbonate solvent, the thioamide compound being thioformamide.

2. The electrolyte according to claim 1, the salt being lithium tetrafluoroborate (LiBF$_4$), and the carbonate solvent being ethyl methyl carbonate (EMC).

3. The electrolyte according to claim 1, the thioamide compound being present in the carbonate solvent at a concentration in a range of from 1 millimolar (mM) to 100 mM.

4. The electrolyte according to claim 3, the thioamide compound being present in the carbonate solvent at a concentration in a range of from 1 mM to 50 mM.

5. The electrolyte according to claim 1, the salt being lithium hexafluorophosphate (LiPF$_6$) or lithium tetrafluoroborate (LiBF$_4$).

6. The electrolyte according to claim 1, the salt being present in the carbonate solvent at a concentration in a range of from 0.5 molar (M) to 5 M.

7. The electrolyte according to claim 1, the carbonate solvent being ethylene carbonate (EC), ethyl methyl carbonate (EMC), or dimethyl carbonate (DMC).

8. An electrochemical battery, comprising:
   an anode;
   a cathode;
   a separator disposed between the anode and the cathode; and
   the electrolyte according to claim 1 disposed within the separator.

9. The electrochemical battery according to claim 8, the anode being a lithium metal anode,
   the cathode being a metal oxide cathode, and
   the electrochemical battery being a lithium-ion battery.

10. A method of fabricating an electrolyte for an electrochemical battery, the method comprising:
    providing a carbonate solvent;
    dissolving a salt in the carbonate solvent; and
    dissolving a thioamide compound in the carbonate solvent to give the electrolyte,
    the thioamide compound being thioformamide.

11. The method according to claim 10, the salt being lithium tetrafluoroborate (LiBF$_4$), and the carbonate solvent being ethyl methyl carbonate (EMC).

12. The method according to claim 10, the thioamide compound being dissolved in the carbonate solvent at a concentration in a range of from 1 millimolar (mM) to 100 mM.

13. The method according to claim 12, the thioamide compound being dissolved in the carbonate solvent at a concentration in a range of from 1 mM to 50 mM.

14. The method according to claim 10, the salt being lithium hexafluorophosphate (LiPF$_6$) or lithium tetrafluoroborate (LiBF$_4$).

15. The method according to claim 10, the salt being dissolved in the carbonate solvent at a concentration in a range of from 0.5 molar (M) to 5 M.

16. The method according to claim 10, the carbonate solvent being ethylene carbonate (EC), ethyl methyl carbonate (EMC), or dimethyl carbonate (DMC).

17. An electrolyte for an electrochemical battery, the electrolyte comprising:
   a carbonate solvent;
   a salt dissolved in the carbonate solvent; and
   a thioamide compound dissolved in the carbonate solvent,
   the thioamide compound being thioformamide,
   the thioamide compound being present in the carbonate solvent at a concentration in a range of from 1 millimolar (mM) to 50 mM,
   the salt being lithium hexafluorophosphate (LiPF$_6$) or lithium tetrafluoroborate (LiBF$_4$),
   the salt being present in the carbonate solvent at a concentration in a range of from 0.5 molar (M) to 5 M, and
   the carbonate solvent being ethylene carbonate (EC), ethyl methyl carbonate (EMC), or dimethyl carbonate (DMC).

18. An electrochemical battery, comprising:
   a lithium metal anode;
   a metal oxide cathode;
   a polypropylene separator disposed between the anode and the cathode; and
   the electrolyte according to claim 17 disposed within the polypropylene separator,
   the electrochemical battery being a lithium-ion battery.

19. The electrochemical battery according to claim 17, the salt being LiBF$_4$, and the carbonate solvent being EMC.

* * * * *